Jan. 19, 1926.                                              1,570,483
J. HAMMERL
MOTOR VEHICLE
Filed April 27, 1922

Inventor:
Jacob Hammerl,
By
Attorney

Patented Jan. 19, 1926.

1,570,483

UNITED STATES PATENT OFFICE.

JACOB HAMMERL, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed April 27, 1922. Serial No. 556,896.

*To all whom it may concern:*

Be it known that I, JACOB HAMMERL, a citizen of the United States, and resident of Detroit, Wayne County, State of Michigan, have invented certain new and useful Improvements in Motor Vehicles, of which the following is a specification.

This invention relates to motor vehicles and particularly to ventilator devices therefor.

In motor vehicles the front compartment thereof in particular, that is the compartment immediately in the rear of the motor or dash, is in warm weather sometimes uncomfortable due to the heat of the motor. Various means of ventilating this compartment have been provided but in most of them ventilation is more or less localized in some particular part of the compartment and as a rule the ventilating device rattles in one or more of its adjusted positions.

One of the objects of the present invention is to provide a ventilator for motor vehicles which will deflect the air to the various parts of the compartment to be ventilated.

Another object of the invention is to provide a motor vehicle ventilator with means for preventing rattle in the various positions of the ventilator.

Other objects of the invention will appear from the following description taken in connection with the drawings, which form a part of this specification, and in which.

Figure 1:
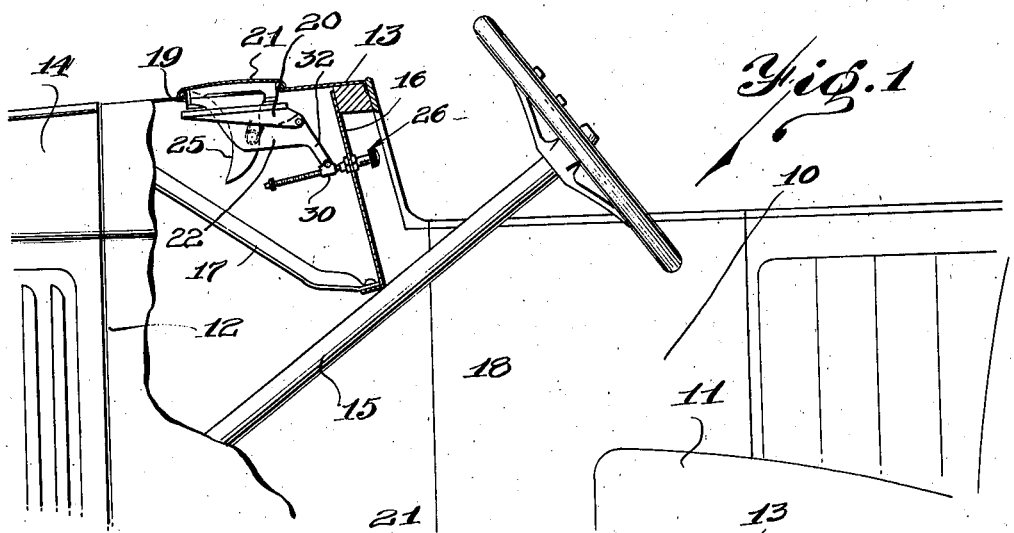
Fig. 1 is an elevation view of part of a motor vehicle embodying the invention, parts being cut away to show the interior of the vehicle body.

Referring to the drawings 10 represents a body of a motor vehicle having a seat 11, a dash 12 and a cowl 13. The motor vehicle engine is mounted under the bonnet 14 and the steering column is shown at 15. An instrument board 16 is shown as extending downwardly from the rear part of the cowl 13 and braced in position by an angle iron 17. The space 18 between the seat 11 and the dash 12 may be called the front compartment of the vehicle and since this compartment is partly enclosed by the cowl, the dash, and the sides of the vehicle it is not well ventilated in hot weather. For the purpose of ventilating this compartment an opening 19 is provided in the cowl 13, preferably in the middle of the upper part thereof.

Figure 2:
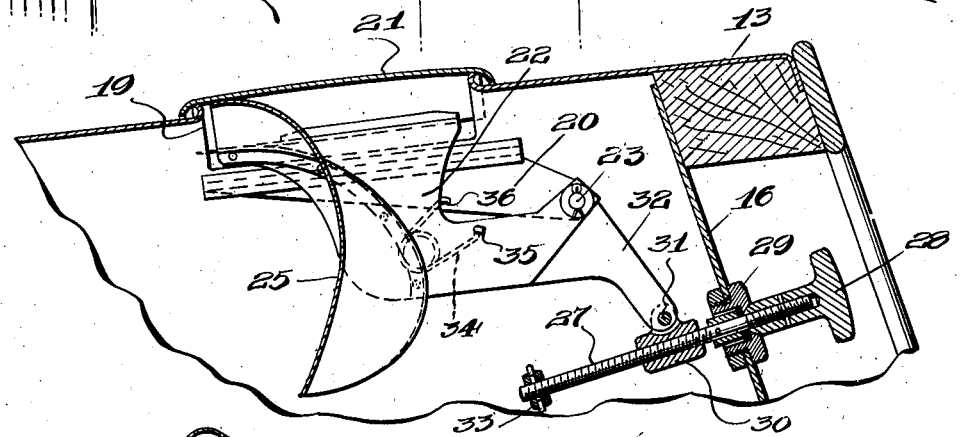
Fig. 2 is an enlarged vertical sectional view of the motor vehicle cowl and the ventilator shown in Fig. 1.

At each side of this opening 19, is a bracket 20 which may be secured to the inner face of the cowl in any desired manner, as by spot welding, and these brackets are adapted to support a cover 21, which will fit snugly over the opening 19 as shown particularly in Figs. 1 and 2. This cover has arms 22 secured to its respective sides and these arms are pivoted as at 23 to the brackets 20, the arms having a cut away portion as at 24 to permit the cover 21 to be opened as shown in Fig. 3.

Figure 3:
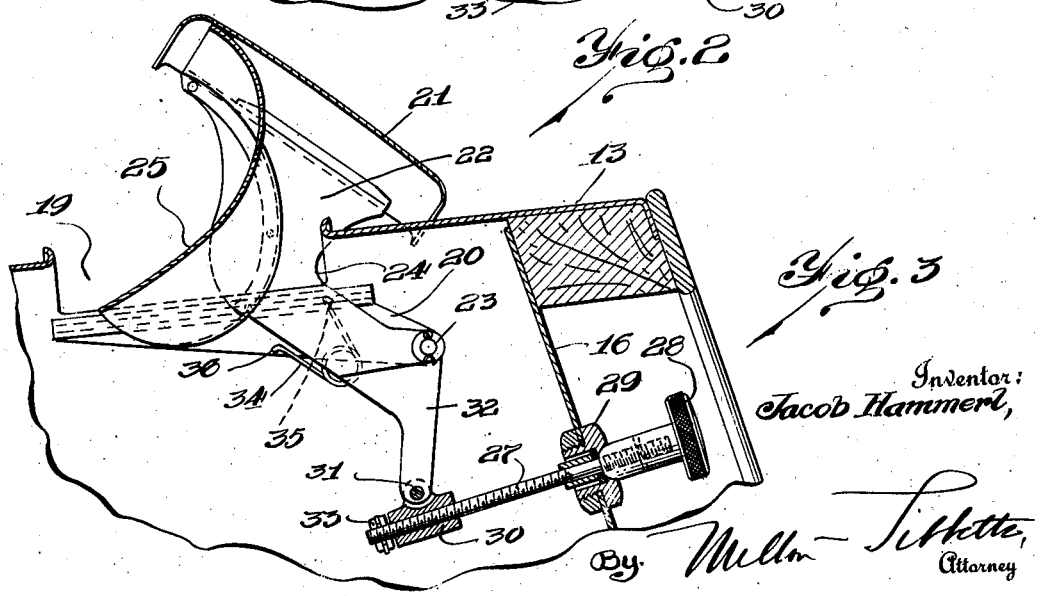
Fig. 3 is a view similar to Fig. 2 with the ventilator in another position.

Secured to the inner face of the cover 21 is a deflector plate 25 which curves downwardly and rearwardly from the front edge of the cover and which also curves laterally from the rear from its middle portion, so that when the cover is partly open or fully open, as it is shown in Fig. 3, for instance, the air will be deflected downwardly by the plate 25 into the compartment 18. By reason of the lateral and rearward curve of the plate 25 the air will also be deflected laterally or to both sides of the compartment 18 and thus a good distribution of air throughout the front of the compartment is effected.

The cover 21, carrying the deflector plate 25, may be operated by the person sitting in the seat 11 by an operating device 26 mounted on the instrument board 16. This device consists of an operating rod 27 having a knob 28 secured to it, which rod extends through a button 29 suitably secured to the instrument board 16 as shown in Figs. 2 and 3. Slight pivotal movement of the rod in the button 29 is provided for. The part of the rod 27 which extends inside of the cowl is threaded as shown and a nut 30 is arranged on this part of the rod and is pivoted as at 31 to an extension 32 on one of the arms 22 of the cover 21. A stop 33 is secured at the outer end of the rod 27 to prevent the nut 30 from traveling too far.

From the above description it will be seen that rotation of the rod 27 by manipulating the knob 28 will cause the nut 30 to travel one way or the other and as the nut travels the cover 21 will be moved on its pivot 23 thus either opening or closing the cover or ventilator.

In order that the cover may not rattle in any of its various positions a spring device 34 is provided. This is shown as a coil spring having two arms one of which, 35, is secured in the arm 22 of the cover and the other of which, 36, is secured in the bracket 20. The points of securing this spring to the arm and bracket are so related to the pivot point 23 that in the position of the cover or ventilator shown in Fig. 2 the spring has a tendency to draw the cover down tight on the cowl while in the position of the cover shown in Fig. 3 the spring has a tendency to force the cover upwardly. In any case the cover is under spring tension at all times so that it will not rattle on its pivot or against the cowl.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination with the cowl having an opening therein, of a deflector plate formed to deflect air inwardly through the opening in the cowl and having a raised portion to divide and deflect the air laterally inside the cowl.

2. In a motor vehicle, the combination with the cowl having an opening therein, of a deflector plate mounted to be adjusted to several different positions, said plate being formed with a raised portion to divide and deflect the air laterally in any of said positions.

3. In a motor vehicle, the combination with the cowl having an opening near the middle of the top thereof, of a deflector plate mounted adjacent said opening and formed with a raised portion to deflect the air downwardly and divide and deflect it laterally inside of the cowl.

4. In a motor vehicle, the combination with the body having an opening therein, of a cover mounted to be moved over and away from said opening, and a deflector plate supported on the cover and curved to deflect air downwardly and laterally inside the body.

5. In a motor vehicle, the combination with the body having an opening therein, of a cover mounted to be moved over and away from said opening, and a deflector plate formed with a raised portion to deflect the air inwardly through said opening and laterally of the opening.

6. In a motor vehicle, the combination with a body and a cowl having an opening centrally arranged in the upper portion thereof, of a cover pivotally mounted to be moved over and away from the opening, and a deflector associated with the cover having a surface curved from front to rear and from the center toward each side, whereby air is deflected downwardly through the opening, and is divided and deflected laterally beneath the cowl.

7. A ventilator for the front body compartment of a motor vehicle having a cowl provided with a centrally arranged opening in the upper portion thereof, comprising a cover for the opening having a depending porton pivotally supported below the cowl, means including a lever to move the cover about said pivotal support over and away from the opening, a spring connected to the cover and to the body and operable to urge the cover away from the body when in its open position, and toward the body when in its closed position, and a deflector associated with the cover having a centrally disposed raised portion to divide the air and adjacent curved portions to distribute the air laterally beneath the cowl.

In testimony whereof I affix my signature.

JACOB HAMMERL.